March 10, 1931. A. S. HOWELL 1,795,490
VIEW FINDER
Filed May 28, 1929 2 Sheets-Sheet 1

Inventor
Albert S. Howell
By Michle & Michle
Attorneys.

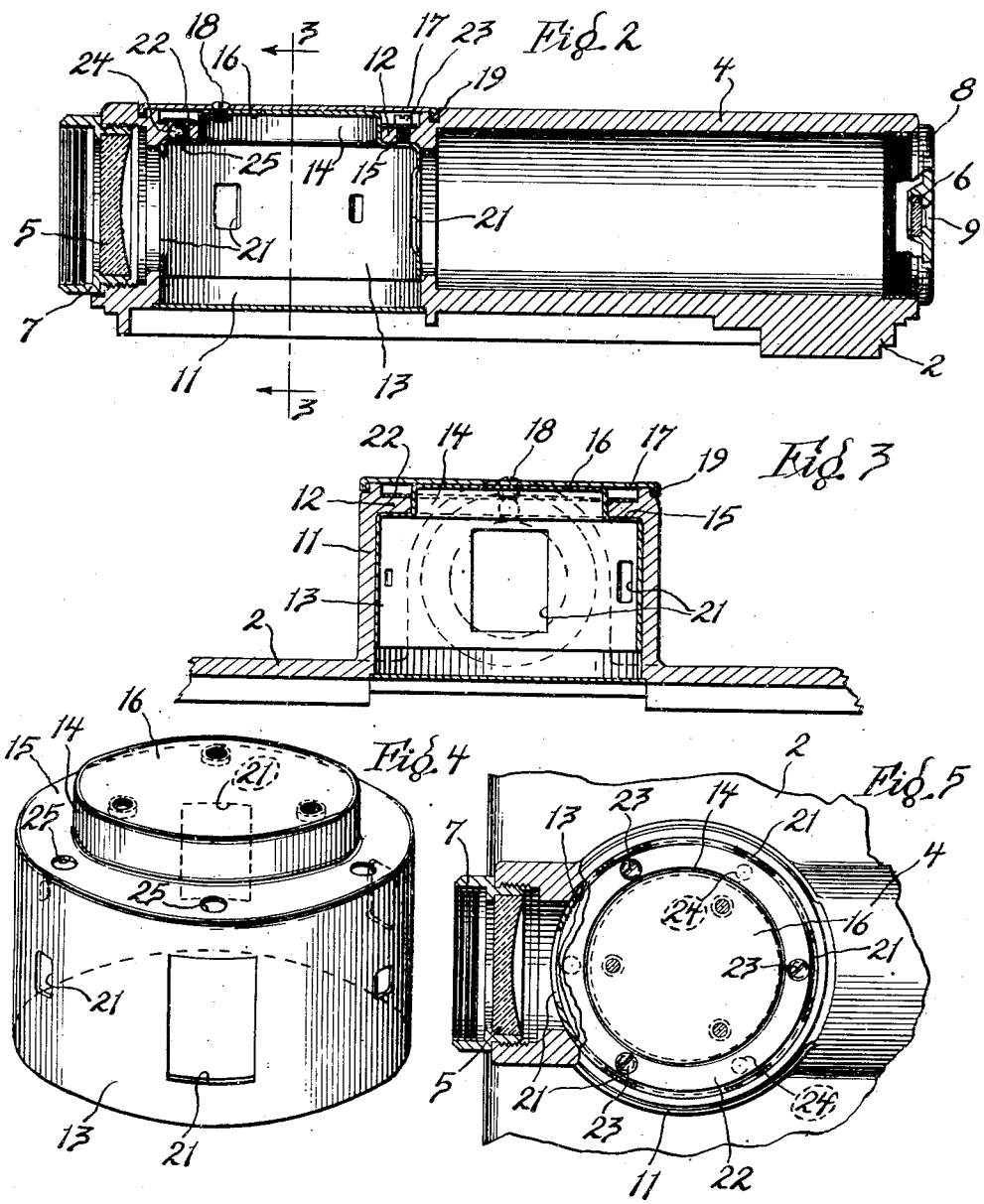

Patented Mar. 10, 1931

1,795,490

UNITED STATES PATENT OFFICE

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS

VIEW FINDER

Application filed May 28, 1929. Serial No. 366,679.

My invention relates particularly to view finders for photographic lenses, although not limited to this use alone.

The main object of my invention resides in the provision of a view finder, the field of which may be varied quickly and conveniently for such purposes as defining the photographic fields of different photographic lenses with which the view finder may be used, whereby to facilitate the interchange of photographic lenses having different photographic fields on photographic cameras equipped with my view finder, and particularly with reference to a certain well known type of motion picture camera.

The invention will be better understood by reference to the accompanying drawings in which—

Figure 2 is a partial section on the line 2—2 of Figure 1;

Figure 3 is a partial section on the line 3—3 of Figure 2;

Figure 4 is a perspective view of the mask member of my view finder, hereinafter described; and Figure 5 is a partial view similar to Figure 1 with parts removed and broken away.

Like characters of reference indicate like parts in the several views.

Figure 1:
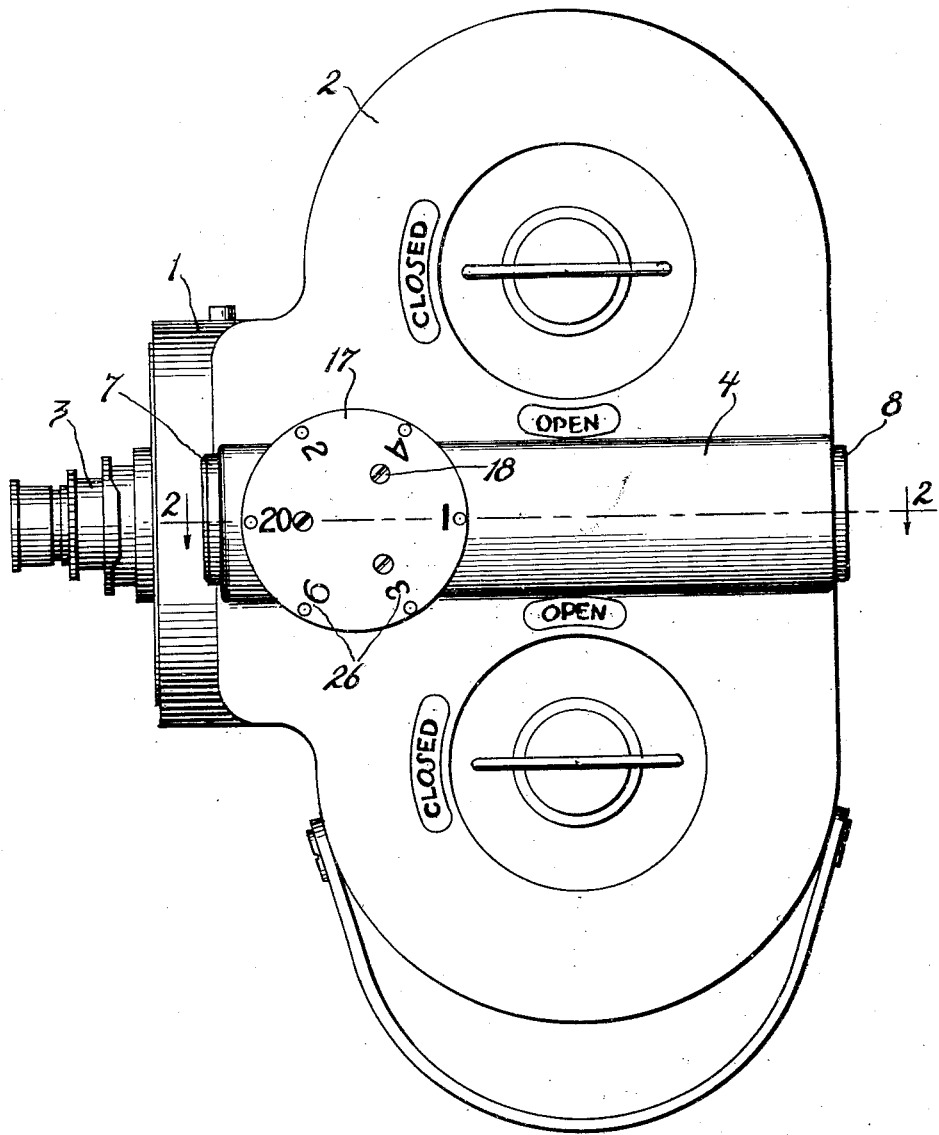
Figure 1 is a side elevation of a motion picture camera of said well known type equipped with the view finder of my invention.

Referring to the drawings, 1 designates generally a motion picture camera, one side of which is formed by a cover 2 removably secured on the main portion of the camera. Interchangeably mounted on the front of the camera is a photographic lens 3 of a usual type. See Figure 1.

The cover 2 is provided with an external integrally formed viewing tube formation 4 extending in adjacent parallelism with the focal axis of the lens 3. See Figures 1, 2 and 5. Complementary lenses 5 and 6 are mounted in suitable mountings 7 and 8 at the front and rear ends of the tubular formation 4, the rear mounting 8 being provided with a small "peep" hole 9 through which one looks in using the view finder.

In order that the field of the image observable through the view finder may correspond with the photographic field of the lens 3 and a number of lenses interchangeable therewith and having different photographic fields, the masking device of my invention is provided, which will now be described.

The viewing tube formation 4 is provided adjacent its front end with an enlarged transversely bored portion 11. See Figures 2, 3 and 5. The bore of the portion 11 is provided with an angular internal flange 12 adjacent the outside thereof or at one side of the tubular formation 4.

A hollow cylindrical mask member 13 is engaged for angular movement in the bore of the portion 11 and has its outer end portion reduced, as designated at 14, and extending through the flange 12 and forming a shoulder 15 axially opposing the inside of this flange. See Figures 2, 3 and 4. The outer end of the mask member 13 is closed, as designated at 16, and an external circular plate 17 is secured against the outer or closed end 16 of the mask member by means of headed screws 18 and overlies the flange 12 and the outer end of the transversely bored portion 11, the circular plate 17 being provided with an inturned peripheral lip 19 for the convenient manipulation thereof to angularly position the mask member 13.

The main portion of the mask member 13 extends across the bore of the viewing tube formation 4, and this portion of the mask member is provided with an angularly arranged plurality of mask openings 21 of different sizes adapted to be selectively positioned in operative relation with the viewing device, above described, in the angular movement of the mask member. See Figures 2 to 5 inclusive.

In the arrangement, as shown, the mask openings are arranged in diametrically opposite pairs of non-interfering mask openings, the cross section of the image area in the view finder at the rear side of the mask member 13 permitting a mask opening at this point somewhat smaller than the mask opening at the front side of the mask member without interfering with the functioning of the mask opening at the front side of the mask member. See particularly Figure 2.

In order that the mask member 13 may be predeterminedly positioned for the positioning of the mask openings in operative relation with the viewing device, the following is provided.

A flat spring ring 22 is secured at angularly spaced intervals against the outside of the flange 12 by means of screws 23, the plate 17 overlying and concealing the same. See Figures 2, 3 and 4. Balls 24 are engaged in angularly spaced apertures through the flange 12, and are engaged by free portions of the spring ring 22 to yieldably urge these balls against the shoulder 15 of the mask member for engagement in locating formations or apertures 25 in this shoulder to predeterminately locate the mask member in the angular positions thereof in which the mask openings 21 are in operative relation with the viewing device.

The outer face of the plate 17 is provided with a scale 26 extending angularly about the same for indicating selectively the several positions of the mask member 13 in which corresponding mask openings 21 are in operative relation with the viewing device.

In use when photographic lenses are interchanged on the camera, the user need only to turn the plate 17 to the position where the corresponding number of the scale 26 is positioned forwardly whereupon the corresponding mask opening of the mask member is in operative relation with the viewing device.

While I have described and shown the preferred embodiment of my invention I do not wish to be limited to the precise details as changes may readily be made without departing from the spirit of my invention, but having thus described my invention, I claim as new and desire to secure by Letters Patent the following:

1. In a view finder the combination with a viewing device, of a cylindrical mask member angularly movable on its axis transverse to the focal axis of the view finder and provided with a plurality of mask openings of different sizes adapted to be selectively positioned in operative relation with the viewing device in said angular movement of said mask member.

2. In a view finder the combination with a viewing device including a viewing tube provided with a transverse bore, of a cylindrical mask member engaged for angular movement in said bore and provided with an angularly arranged plurality of different mask openings disposed in diametrically opposite pairs of non-interfering openings adapted to be selectively positioned in operative relation with the viewing device in said angular movement of said mask member.

3. In a view finder the combination with a viewing device including a viewing tube provided with an enlarged transversely bored portion, of a cylindrical mask member engaged for angular movement in said bored portion and provided with an angularly arranged plurality of mask openings of different sizes disposed in diametrically opposite pairs of non-interfering openings adapted to be selectively positioned in operative relation with the viewing device in said angular movement of said mask member, and an external manipulating member at one end of said bored portion and fast with said mask member and provided with an indicating means for indicating the angular positions of said mask member.

4. In a view finder the combination with a viewing device including a viewing tube provided with an enlarged transversely bored portion, of a cylindrical mask member engaged for angular movement in said bored portion, means for predeterminately locating said mask member in a plurality of angular positions thereof, a manipulating member at one end of said bored portion and fast with said mask member and provided with indicating means for indicating selectively said positions of said mask member.

5. In a view finder the combination with a viewing device including a viewing tube provided with a transverse bore having an angular internal flange at one side of said tube, of a cylindrical mask member engaged for angular movement in said bore and axially opposing the inside of said flange, and a manipulating member secured with said mask member and overlying the outside of said flange.

6. In a view finder the combination with a viewing device including a viewing tube provided with a transverse bore having an angular internal flange at one side of said tube, of a cylindrical mask member disposed for angular movement in said bore and having an end portion thereof reduced and extending through said flange and forming a shoulder axially opposing the inside of said flange, means associated with said flange and shoulder for predeterminately locating said mask member in a plurality of angular positions thereof, and a manipulating member secured on the reduced end of said mask member and overlying the outside of said flange.

7. In a view finder the combination with a viewing device including a viewing tube provided with a transverse bore having an angular internal flange at one side of said tube, of a cylindrical mask member engaged for angular movement in said bore and having an end portion thereof reduced and extending through said flange and forming a shoulder axially opposing the inside of said flange, a flat spring ring secured at angularly spaced intervals against the outside of said flange, balls engaged in apertures through said flange and engaged by free portions of said spring ring to yieldably urge said balls against said shoulder for engagement in locating formations thereon, and a manipulating member secured against the reduced end of said mask member and overlying the outside of said flange.

In witness whereof I hereunto affix my signature this 20th day of May, 1929.

ALBERT S. HOWELL.